United States Patent
Haynes et al.

(10) Patent No.: US 9,292,155 B2
(45) Date of Patent: *Mar. 22, 2016

(54) TOOL-TIP FOR MULTIMEDIA FILES

(75) Inventors: Thomas R. Haynes, Apex, NC (US); Hung V. Lam, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1441 days.

This patent is subject to a terminal disclaimer.

(21) Appl. No.: 12/259,246

(22) Filed: Oct. 27, 2008

(65) Prior Publication Data
US 2009/0049383 A1  Feb. 19, 2009

Related U.S. Application Data

(63) Continuation of application No. 10/294,801, filed on Nov. 14, 2002, now Pat. No. 7,512,881.

(51) Int. Cl.
*G06F 3/0481* (2013.01)
*G06F 17/30* (2006.01)

(52) U.S. Cl.
CPC ........ *G06F 3/0481* (2013.01); *G06F 17/30716* (2013.01)

(58) Field of Classification Search
CPC .................. G06F 3/0481; G06F 17/30716
USPC ......... 715/702, 711, 712, 862, 859, 860, 861, 715/838, 727–729; 709/227, 219, 225
See application file for complete search history.

(56) References Cited

U.S. PATENT DOCUMENTS

| | | | |
|---|---|---|---|
| 6,760,884 B1 * | 7/2004 | Vertelney et al. | 715/202 |
| 7,231,023 B1 * | 6/2007 | Begeja et al. | 379/93.01 |
| 7,346,689 B1 * | 3/2008 | Northcutt et al. | 709/227 |
| 7,512,881 B2 * | 3/2009 | Haynes et al. | 715/711 |
| 2001/0019420 A1 * | 9/2001 | Sanbongi et al. | 358/1.15 |
| 2002/0163545 A1 | 11/2002 | Hii | |
| 2003/0197785 A1 * | 10/2003 | White et al. | 348/207.99 |
| 2004/0064209 A1 * | 4/2004 | Zhang | 700/94 |
| 2004/0084209 A1 * | 5/2004 | Manepalli et al. | 174/260 |
| 2004/0205514 A1 * | 10/2004 | Sommerer et al. | 715/501.1 |
| 2007/0038941 A1 * | 2/2007 | Wysocki et al. | 715/748 |

OTHER PUBLICATIONS

Microsoft File Explorer, 2001.*

* cited by examiner

*Primary Examiner* — Steven Sax
(74) *Attorney, Agent, or Firm* — Steven M. Greenberg, Esq.; CRGO LAW

(57) ABSTRACT

A tool-tip presentation system for multimedia files. The tool-tip presentation system can be configured to respond to proximity events associated with a selected entry in a list of multimedia files such as screen captured images or complete audio files. Based upon the selected entry, a corresponding multimedia sample such as a thumbnail image of a screen captured image or an audio sample of the audio file can be retrieved and presented as a tool-tip. In particular, the tool-tip can be displayed in a position which is proximate to the selected entry. In this way, one who interacts with the list of multimedia files need not load each complete multimedia file in the list in order to determine the contents of the multimedia file. Rather, the multimedia sample in the tool-tip can suffice.

3 Claims, 3 Drawing Sheets

TOOL-TIP FOR MULTIMEDIA FILES

CROSS-REFERENCE TO RELATED APPLICATIONS

Figure 1A:
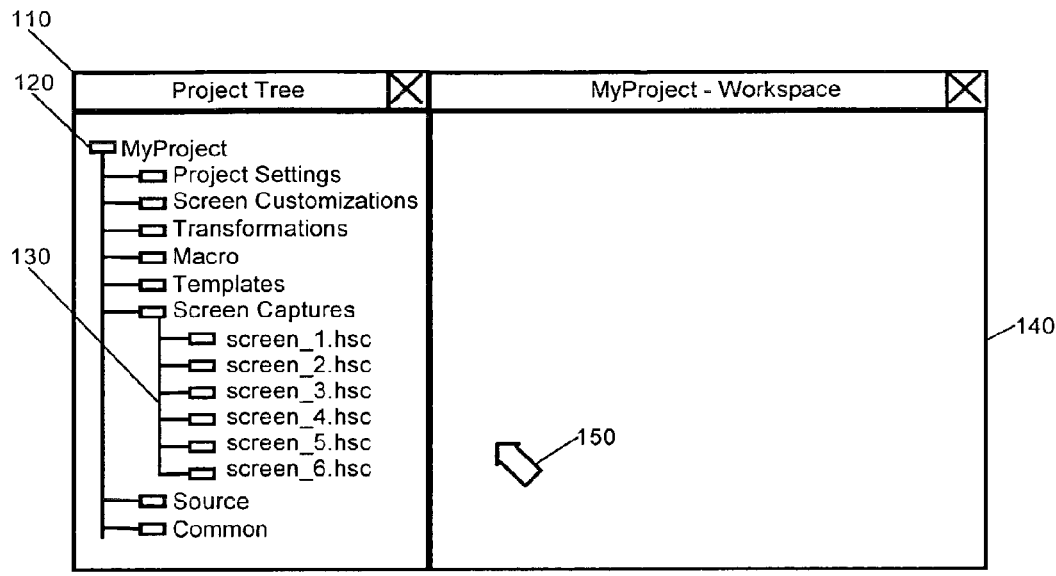

This application is a Continuation of U.S. application Ser. No. 10/294,801, filed Nov. 14, 2002, issued as U.S. Pat. No. 7,512,881 on Mar. 31, 2009, entitled "TOOL-TIP FOR MULTIMEDIA FILES," which is incorporated herein by reference in its entirety.

BACKGROUND OF THE INVENTION

1. Field of the Invention

The present invention relates to graphical user interface elements and more particularly to a tool-tip.

2. Description of the Related Art

Typical tool-tips are miniaturized graphical elements superimposed over an interface element in a user interface so as to provide supplemental information to one interacting with the user interface. Tool-tips can range from simple textual data, to graphical images. Tool-tips initially were developed to provide an enhanced explanation of the functionality of an underlying button in a tool box. Tool-tips had become necessary primarily because the graphical imagery in the button had become so complex as to lose its association with the underlying functionality of the button. Consequently, textual tool-tips were provided in order to "explain" the underlying functionality of the button in ordinary conversational language.

In the conventional tool-tip system, a tool-tip can become activated upon the occurrence of a user interface event such as a mouse-over event associated with a particular user interface elements such as a button or a menu item. While the tool-tip may not become activated immediately, the tool-tip can become activated in those circumstances where the mouse pointer giving rise to the mouse-over event does not move beyond the boundaries of the user interface element. To that end, the hesitancy of the mouse pointer can be treated as an indication that the user does not recognize the consequence of selecting the user interface element and will require additional information regarding the functionality of the user interface element.

Importantly, tool-tips have been limited to providing supplemental information regarding the functionality of an underlying user interface element. Such user interface elements typically include menu items and tool bar buttons. Tool-tips also have been used to provide a pop-up textual description of non-textual content such as an image. Specifically, upon occurrence of a mouse-over event in proximity to an image, a tool-tip can provide a textual explanation of the image. Still, while tool-tips have the inherent potential to be applied to many user interface problems, tool-tips have not been applied to problems falling outside of the realm of "explaining" elements of a user interface.

Screen capturing technology has been an important part of computing technology for many years. Screen capturing specifically refers to the generation of a stored image of a computer screen, much akin to a "snap shot". Initially, screen capturing technology had been applied to computer education and training. In particular, screen capturing had become an indispensable element of creating application training manuals so that the reader could associate textual, written instructions within an application instruction manual to the desired result presented on the computer screen.

More recently, screen capturing technology has been used to transform the user interface of a legacy application to a current application. For instance, the WebSphere.™. Host Access Transformation Server (HATS.™.), manufactured by International Business Machines Corporation of Armonk, N.Y., United States, provides a set of comprehensive tools for extending legacy applications such as those hosted within the 3270 and 5250 operating environments into the World Wide Web (Web). To facilitate the transformation of a mainframe or midrange hosted application to a Web-based application, screen captures of the host application can be processed into Web screens dynamically with little or no user intervention.

Within transformation applications such as HATS, an integrated development environment can provide the transformation developer with resources to customize the resulting Web-based application. As part of the integrated development environment, a directory of screen captured images of the legacy application can be provided for selection by the developer. Once a particular screen captured image has been selected, the screen captured image can be loaded and the developer can interact with the loaded screen captured image in order to customize the operation of the display in the Web-based application.

Screen captured images, like other traditional computer images, can require intense computing resources in order to load the particular screen captured image. Consequently, it can be disadvantageous to load a particular screen captured image unless the developer has specific intent to interact with the particular screen captured image. Where the screen captured images have been stored using a less than descriptive naming convention, however, it can be difficult to identify the particular screen captured image with which a developer is desirous of interaction. Accordingly, notwithstanding the waste of computing resources, the developer will be compelled to load each screen captured image in order to identify the desired particular screen captured image.

BRIEF SUMMARY OF THE INVENTION

The present invention is a tool-tip presentation system for multimedia files such as screen captured images and complete audio files. The tool-tip presentation system can be configured to respond to proximity events associated with a selected entry in a list of complete multimedia files such as screen captured images and audio files. Based upon the selected entry, a corresponding multimedia sample such as a thumbnail image of a screen captured image or an audio sample can be retrieved and presented as a tool-tip. In particular, the tool-tip can be displayed in a position which is proximate to the selected entry. In this way, one who interacts with the list of complete multimedia files need not load each multimedia file in the list in order to determine the contents of the multimedia file. Rather, the multimedia sample in the tool-tip can suffice.

In one aspect of the present invention, a tool-tip presentation system can include a list of screen captured images; a store of thumbnail images corresponding to the screen captured images; and, tool-tip logic configured to detect a placement of a user interface input device proximate to an entry in the list of screen captured images, and responsive to the detection, to retrieve and display a corresponding one of the thumbnail images. Notably, the screen captured images can be images of legacy host application screens. Also, the user interface input device can be a mouse pointer. In that case, the tool-tip logic can include an event handler programmed to detect a mouse-over event caused by placing the mouse pointer in a screen position which is proximate to the entry. Responsive to the detection, the tool-tip logic can retrieve and display a corresponding one of the thumbnail images.

In another aspect of the invention, a tool-tip display system can include a modifiable coupling to an index of thumbnail images. More particularly, each image can correspond to a particular screen captured image. A data member of the system further can be included and can be configured to store a reference to an entry in a list of screen captured images. Finally, display logic programmed to display as a tool-tip a selected thumbnail image specified in the index based upon a reference to a screen captured image stored in the data member.

A tool-tip display method can include detecting a proximity event associated with a particular screen captured image in a list of screen captured images. Responsive to the detection, a thumbnail image can be located which corresponds to the particular screen captured image. Subsequently, the located thumbnail image can be displayed in a tool-tip in a position which is proximate to the particular screen captured image in the list of screen captured images. Importantly, the proximity event can be a mouse-over event associated with the particular screen captured image.

BRIEF DESCRIPTION OF THE SEVERAL
VIEWS OF THE DRAWINGS

Figure 1B:
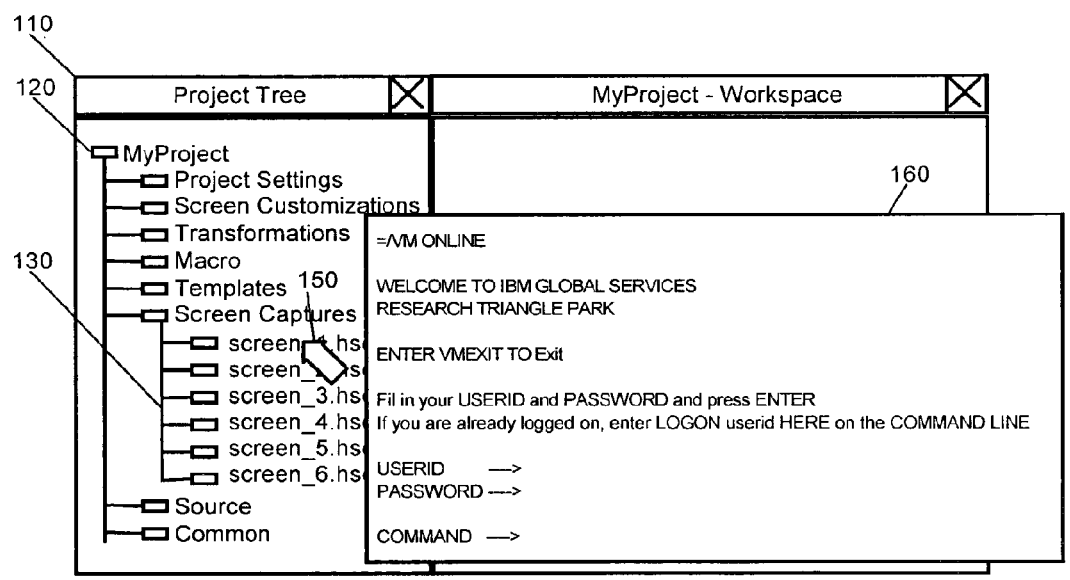
Figure 2:
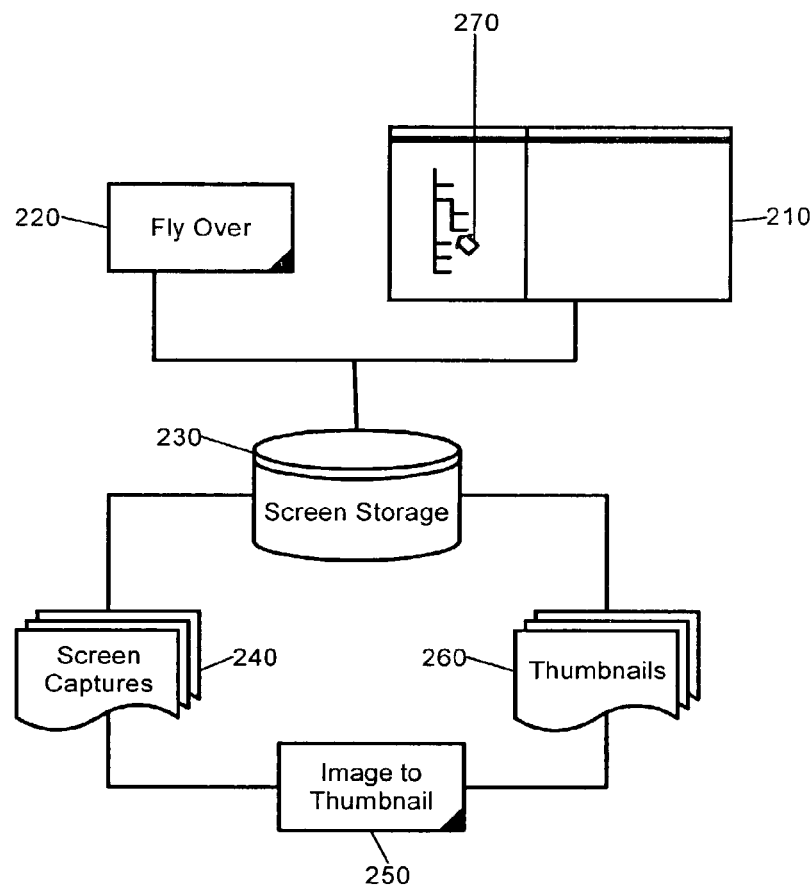
Figure 3:
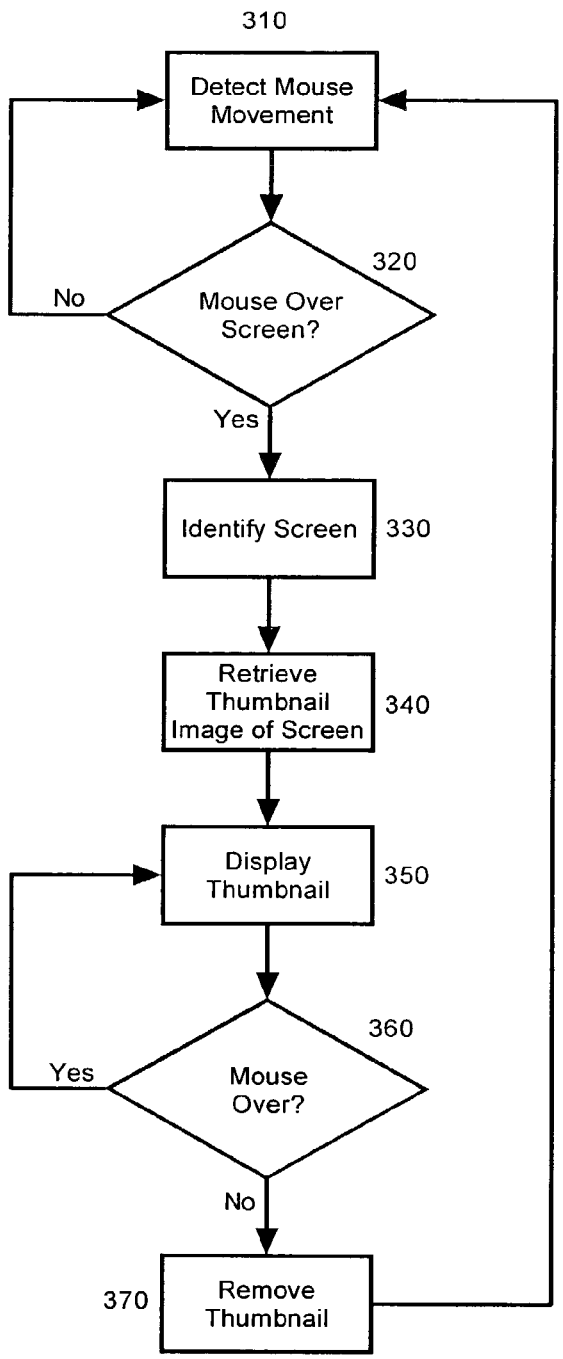

There are shown in the drawings embodiments which are presently preferred, it being understood, however, that the invention is not limited to the precise arrangements and instrumentalities shown, wherein:

FIGS. 1A and 1B, taken together, are a pictorial illustration of a graphical tool-tip for use in presenting an exemplary representation of an underlying screen capture;

FIG. 2 is a block diagram illustrating a tool-tip system which has been configured in accordance with the inventive arrangements; and, FIG. 3 is a flow chart illustrating a process for displaying a tool-tip of a selected screen capture in accordance with the inventive arrangements.

DETAILED DESCRIPTION OF THE INVENTION

The present invention is a multimedia tool-tip for screen captures. In particular, in accordance with the inventive arrangements, multimedia samples such as a thumbnail image or an audio sample can be generated from a complete multimedia file such as a screen captured image or an audio file stored within fixed storage. Each of the multimedia samples can be linked to a trigger event associated with a listing of the stored complete multimedia files, such as an keyboard select or mouse-over event. Upon the occurrence of the trigger event, the multimedia sample associated with the particular entry in the listing giving rise to the trigger event can be presented through the use of a tool-tip. In this way, the end-user can recognize the contents of the listed complete multimedia file without first loading the complete multimedia file from storage.

Importantly, the tool-tip system of the present invention advantageously can be applied to the integrated development environment of an application development system. In that regard, FIGS. 1A and 1B, taken together, are a pictorial illustration of a multimedia tool-tip for use in presenting an exemplary representation of an underlying screen capture in a development environment. Turning first to FIG. 1A, an integrated development environment is shown which can include, for instance, a project tree 110 in which a listing of project files and settings can be listed, and a project workspace 140 in which the contents of individual ones of the project files and settings can be displayed.

The project tree 110 can include a hierarchy 120 of project files and settings, such as source code, macros, project settings and the like. Notably, the hierarchy 120 also can include a listing of screen captured images 130, particularly, where the integrated development environment has been included as part of a transformation module of a host access transformation server intended to transform the user interface of a host-based application to that of a Web-based application. In that circumstance, it would be expected by one skilled in the art that the listing of screen captured images 130 would include images of selected screens in the host based application.

Ordinarily, in a development environment such as the environment depicted in FIGS. 1A and 1B, a developer can select an individual entry in the listing of screen captured images 130 so as to load and interact with the particular selected screen captured image. Where the naming convention applied to the listing of screen captured images 130, however, does not adequately describe the contents of each image in the listing of screen captured images 130, it will not be necessary for the developer to individually load each screen captured image in order to identified a desired one of the screen captured images. Rather, as shown in FIG. 1B, the developer can position the mouse pointer 150 over the desired entry in the listing of screen captured images 130 causing the display of a tool-tip thumbnail 160 of the desired one of the screen captured images.

Also, one skilled in the art will recognize that when applied not to graphical thumbnails, but to audio samples, the multimedia tool-tip of the present invention can provide a "preview" of an underlying complete audio file which are known in the art to be quite large and to require substantial resources to load and playback. Notably, the use of an audio sample as a tool-tip also can provide an accessibility advantage to those who might be considered visually impaired, or to those who do not have an optimal visual view of the application. In that case, the audio sample can provide an audio cue of the contents of the underlying complete audio file.

FIG. 2 is a block diagram illustrating a tool-tip system which has been configured in accordance with the inventive arrangements. The tool-tip system can include an application program 210 in which a listing of screen captured images 270 can be provided. The listing of screen captured images 270 can include any operational representation of a set of screen captured images, such as a textual listing, a hierarchical tree, a block of icons, or a bar of buttons, to name a few. Each entry in the listing of screen captured images 270 can be linked to event logic which can include fly-over logic 220. The fly-over logic 220 can process a mouse-over event, a selection event, or some other such event which can be activated when a user input element such as a cursor or mouse pointer is placed above or in close proximity to a linked user interface element. The fly-over logic 220 particularly can be configured upon activation to load and display a thumbnail image of a screen captured image associated with the linked user interface element. In particular, the fly-over logic 220 can be configured for activation after a pre-set period of time has elapsed during which the mouse pointer has remain nearly or completely idle, or within the boundary of the linked user interface element.

Each of the fly-over logic 220 and the application program 210 can be communicatively coupled to fixed storage 230 in which a set of screen captured images 240 can be stored. Each one of the screen captured images 240 can be processed in a thumbnail generation process 250 to produce a corresponding thumbnail 260 which also can be stored in fixed storage 230. In this way the fly-over logic 220, upon activation, can retrieve a suitable thumbnail image 260 associated with a screen captured image 230 linked to a user interface element representing the screen captured image 240 stored in fixed storage 230.

FIG. 3 is a flow chart illustrating a process for displaying a tool-tip of a selected screen capture in accordance with the inventive arrangements. The process preferably can be performed in fly-over logic responsive to a mouse-over event, though the invention is not so limited to the occurrence of a mouse-over event or the performance of the process entirely within the fly-over logic. Beginning in block 310, the movement of the mouse can be detected. In decision block 320 it can be determined whether the mouse has been placed in proximity to an entry in a listing of screen captured images for a period of time which exceeds a pre-configured duration. If not, the process can repeat through block 310. Otherwise, in block 330, the particular screen captured image in proximity to which the mouse has been placed can be identified.

In block 340, a thumbnail image associated with the identified screen captured image can be retrieved and in block 350 the retrieved thumbnail image can be displayed. In decision block 360, if the mouse has moved out of proximity to the entry in the listing of screen captured images, in block 370 the thumbnail can be removed from display. Otherwise, the thumbnail can remain displayed through block 350.

The present invention can be realized in hardware, software or firmware, in a centralized fashion in one computer system, or in a distributed fashion where different elements are spread across several interconnected computer systems. Any kind of computer system, or other apparatus adapted for carrying out the methods described herein, is suited to perform the functions described herein. A typical centralized implementation could include a general purpose computer system with a computer program that, when being loaded and executed, controls the computer system such that it carries out the methods described herein.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A tool-tip presentation system comprising:
    a list of screen captured images of terminal displays of a text based legacy host application; a store of multimedia samples, each multimedia sample corresponding to a particular screen captured image; and,
    tool-tip logic configured to detect a placement of a user interface input device proximate to an entry in said list of screen captured images, and responsive to said detection, to retrieve and present a corresponding one of said multimedia samples,
    wherein said multimedia samples are audio samples providing an audible summary corresponding to said screen captured images.

2. The system of claim 1, wherein said user interface input device is a mouse pointer.

3. The system of claim 2, wherein said tool-tip logic comprises, an event handler programmed to detect a mouse-over event caused by placing said mouse pointer in a screen position which is proximate to said entry, and responsive to said detection, to retrieve and present a corresponding one of said multimedia samples.

* * * * *